(No Model.)
R. DODSON.
NUT LOCK.
No. 299,755. Patented June 3, 1884.
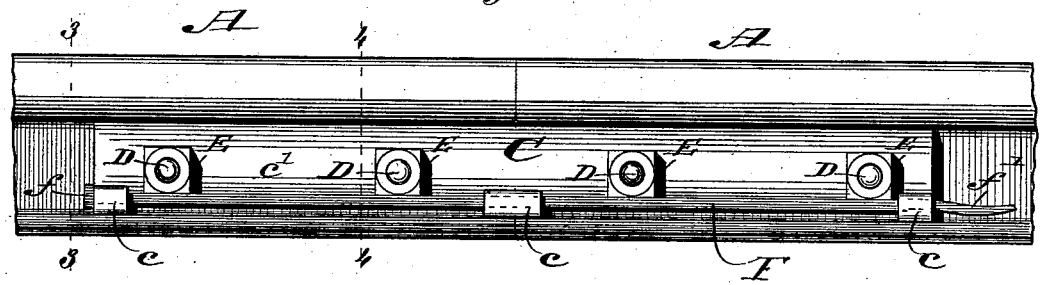
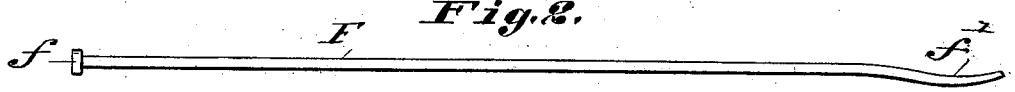
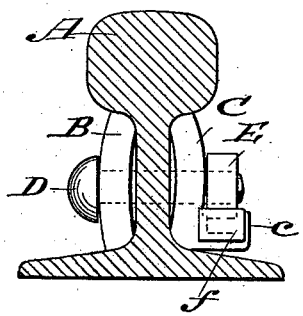
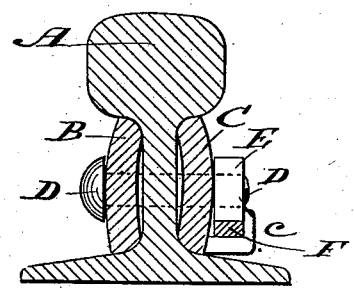
Attest:
Charles Pickle
C. C. Hunt
Inventor:
Roy Dodson
by C. D. Moody
atty

UNITED STATES PATENT OFFICE.

ROY DODSON, OF CENTRAL, ST. LOUIS COUNTY, MISSOURI.

NUT-LOCK.

SPECIFICATION forming part of Letters Patent No. 299,755, dated June 3, 1884.

Application filed March 1, 1884. (No model.)

*To all whom it may concern:*

Be it known that I, ROY DODSON, of Central township, St. Louis county, Missouri, have made a new and useful Improvement in Nut-Locks, of which the following is a full, clear, and exact description, reference being had to the annexed drawings, making part of this specification, in which—

Figure 1 is a side elevation of a railway-joint having the improvement; Fig. 2, a side elevation of the locking-rod; Fig. 3, a cross-section on the line 3 3 of Fig. 1, and Fig. 4 a cross-section on the line 4 4 of Fig. 1.

The same letters of reference denote the same parts.

This invention consists in employing, in connection with two fish-bars, one of which is provided with lips, a spring-locking rod headed at one end and bent or crooked at the other, substantially as hereinafter described, and designated in the claim.

A A, Fig. 1, represent the opposing rail ends of a railway-joint.

B represents the fish-bar upon one side of the rails, and C represents the fish-bar on the opposite side of the rails.

D D represent the bolts, and E E represent the nuts. That one, C, of the fish-bars which is upon the side of the rails where the nuts are used is provided with a lip or lips, *c c*, Figs. 1, 3, 4. These lips project outwardly and upwardly from the main portion *c'* of the fish-bar, and their office is to receive and support what may be termed the "spring locking-rod" F, which is inserted between the nuts E E and the lips *c c*, in the position shown in Figs. 1, 3, 4—that is, the spring locking-rod, when in position, rests in and bears down upon the lips *c c* and bears upward against the nuts E E. The locking-rod therefore operates to prevent the nuts from unscrewing upon the bolts.

In operation, the nuts E E are screwed up and the bolts D D are tightened in the ordinary manner, after which the spring locking-rod is inserted endwise into the space between the lips and the nuts. The rod at one end is provided with a suitable head, *f*, and at the other end, *f'*, is crooked slightly, substantially as shown in Figs. 1, 2. In this manner the locking-rod, while serving to hold the nuts E E in place, in turn is held in position by the nuts and lips, and is prevented from moving endwise out of place by the head *f* and the crook *f'*. The locking-rod is made of spring material, to enable the end *f'* to yield slightly as it is passing the nuts and lips, and then to spring downward, substantially as shown, after it has passed the end of the fish-bar.

Any suitable method may be adopted in attaching the lips *c c* to the body *c'* of the fish-bar—that is, they may be riveted or welded to the fish-bar; or, in making the fish-bar, the lips may be an integral part thereof, and afterward shaped into position.

A modification of the construction shown is attaching the lips to the upper edge of the fish-bar in place of to the lower edge, so as to cause the spring locking-rod to bear downward upon the upper sides of the nuts E E, instead of upward against the under side of the nuts, as shown.

I claim—

The combination of the rails A A, the fish-bar B, the fish-bar C, having lips *c c*, the bolts D D, the nuts E E, and the spring locking-rod F, having the head *f* and the crooked end *f'*, substantially as and for the purposes described.

ROY DODSON.

Witnesses:
C. D. MOODY,
C. E. HUNT.